United States Patent
Bacardit

(10) Patent No.: US 7,950,128 B2
(45) Date of Patent: May 31, 2011

(54) METHOD FOR ASSEMBLING A PNEUMATIC BOOSTER

(75) Inventor: Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 1302 days.

(21) Appl. No.: 10/581,837

(22) PCT Filed: Dec. 15, 2004

(86) PCT No.: PCT/EP2004/014280
§ 371 (c)(1),
(2), (4) Date: Jun. 5, 2006

(87) PCT Pub. No.: WO2005/070584
PCT Pub. Date: Aug. 4, 2005

(65) Prior Publication Data
US 2007/0119166 A1 May 31, 2007

(30) Foreign Application Priority Data
Dec. 24, 2003 (FR) ..................................... 03 15495

(51) Int. Cl.
*B21D 39/02* (2006.01)
*B60T 8/44* (2006.01)
(52) U.S. Cl. .......... 29/505; 29/509; 403/282; 303/114.3
(58) Field of Classification Search .................... 29/463, 29/505, 509, 243.5; 72/76, 120, 121, 201; 303/114.3; 91/369.2
See application file for complete search history.

(56) References Cited

U.S. PATENT DOCUMENTS

| 5,107,579 | A |  | 4/1992 | Kostermeier |
| 5,150,508 | A | * | 9/1992 | St. Denis .......................... 29/463 |

FOREIGN PATENT DOCUMENTS

| DE | 270632 |   | 8/1978 |
| DE | 2704632 | A * | 8/1978 |
| GB | 2082275 |   | 3/1982 |
| GB | 2082275 | A * | 3/1982 |
| GB | 2166410 |   | 5/1986 |
| GB | 2166410 | A * | 5/1986 |

* cited by examiner

*Primary Examiner* — Jermie E Cozart
(74) *Attorney, Agent, or Firm* — Michael Best & Friedrich LLP

(57) ABSTRACT

A device (100) for assembling a pneumatic booster (200) wherein a cover (203) of the booster is housed in a support (101) and a cylindrical cap (104) whose internal volume (107) is greater than a volume of a cylinder (206) of the booster, covers the cylinder placed on the cover. A gearing element (110) of the device rotates two sets of rollers (109A and 109B) about the booster and an eccentric (118) controlled by the gearing element allows an oscillating movement of the rollers against a wall of the booster. The swaging is achieved by alternately applying the rollers (109A) and (109B) and an angle of attack (114A) of the first rollers is greater than an angle of attack (114B) of the second rollers.

8 Claims, 2 Drawing Sheets

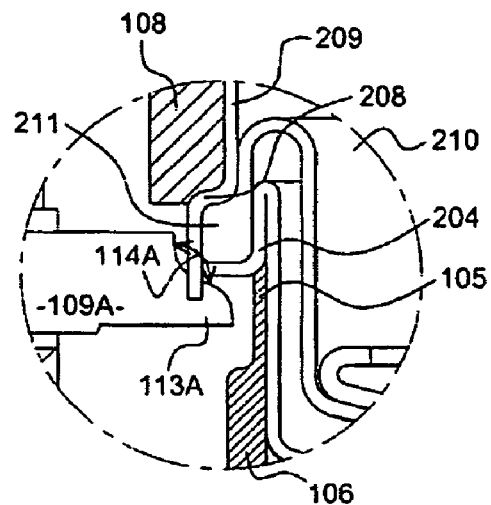 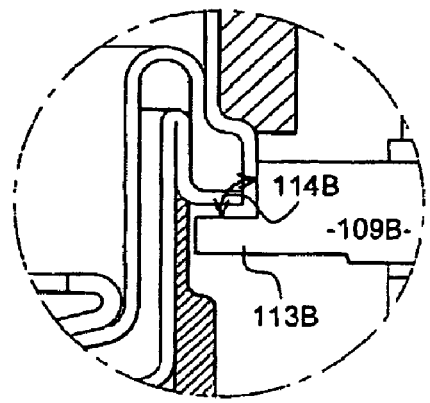
Fig. 2a  Fig. 2b
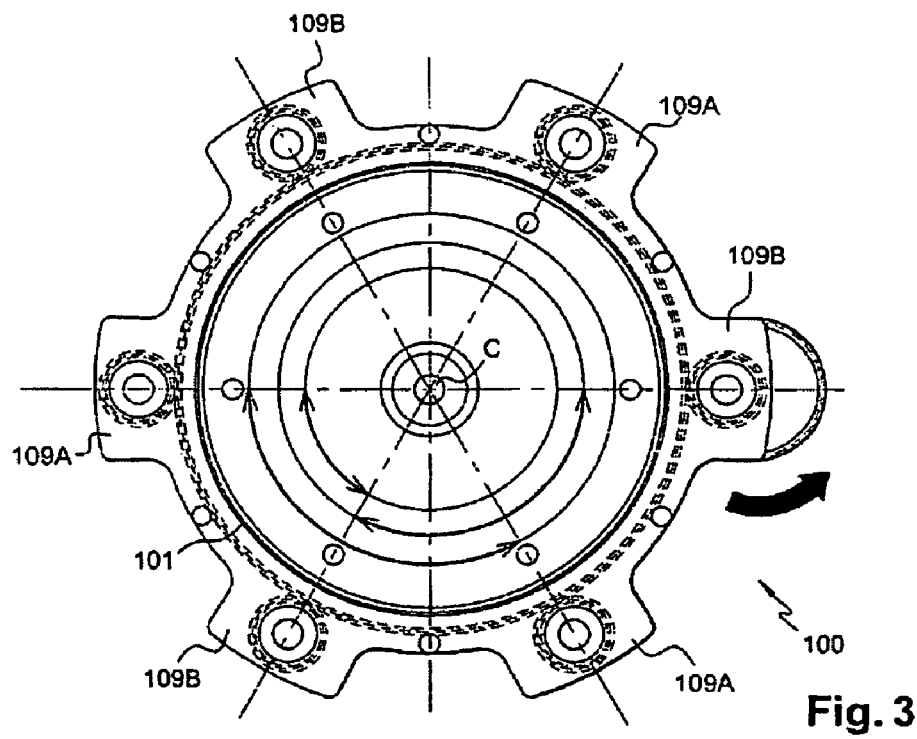
Fig. 3

METHOD FOR ASSEMBLING A PNEUMATIC BOOSTER

BACKGROUND OF THE INVENTION

The invention relates to a device for assembling a pneumatic booster of a motor vehicle braking device. More precisely, the invention relates to a device making it possible to fixedly attach a cover and a cylinder of a pneumatic booster. The invention also relates to a method making it possible to assemble the cylinder and the cover by using the device of the invention. The invention finally relates to a pneumatic booster.

One object of the invention is to provide a booster that can be used safely in a braking device. Another object of the invention is to prevent a disassembly of the booster during its use, irrespective of the thickness of a metal sheet forming the booster. An additional object of the invention is to provide a booster that is lightweight, without its strength being affected.

In a motor vehicle braking device, a booster may be mounted between a brake control and a master cylinder. The pneumatic booster has the role of amplifying a force at the brake control, so that a hydraulic pressure in the master cylinder is greater.

A booster may be furnished with a generally cylindrical-shaped casing. The casing is formed of a cylinder and a cover. The cylinder and the cover are fixedly attached to one another. A front chamber and a rear chamber are arranged in an internal volume of the casing. The front chamber is directed toward the master cylinder, and has a variable volume. The rear chamber, equally with a variable volume, is directed toward the brake control. The front chamber is separated from the rear chamber by a movable partition. The movable partition is formed by a sealed and flexible membrane and by a rigid skirt plate. The front chamber is connected pneumatically to a vacuum source. The rear chamber is connected pneumatically, in a manner controlled by a valve, to a source of propelling fluid. A brake control actuates a control rod of the booster. The actuation of the rod controls the opening of the valve and an inflow of fluid into the rear chamber. The change of pressure that results therefrom causes a movement of the rigid skirt plate.

During braking, wrenching forces exerted at the location of the booster are extremely great. Specifically, the chambers of the booster are subjected to sudden changes of pressure. In particular, during braking, air is allowed into the rear chamber. This inlet of air propels the movable partition toward the front chamber. Since the casing of the booster is made of two originally independent parts, it is essential that these two parts are firmly fixed together. It is therefore necessary that the contact between the cover and the cylinder is sufficient so that, during braking and more precisely during the propulsion of the skirt plate, the cylinder is not wrenched away from the cover.

In order to ensure that the cover is properly attached to the cylinder, spot swaging is currently carried out on an external periphery of the walls of the cover and the cylinder. "Spot swaging" means swaging at localized points. In order to hold the cylinder firmly onto the cover, these swaging points are evenly distributed over the whole external periphery of the casing. Hitherto, such an assembly has been sufficient.

However, for some time, the search has been on to reduce the weight of the booster. Specifically, the booster and more precisely the booster casing is formed of metal sheet walls. A thickness of the metal sheet and a shape of the booster therefore have an effect on its weight. The search in particular is to reduce the weight of the booster by reducing the thickness of the metal sheet forming the casing. The thickness and the shape of the booster have been modified in order to obtain a minimum weight. "Minimum weight" means the lowest weight of the booster at which the same rigidity and the same resistance to wrenching as a conventional booster is obtained.

However, the breaking strength at the location of the join between the cover and the cylinder is reduced. A spot swaging of the cover with the cylinder therefore does not provide full satisfaction when the thickness of the metal sheet is greatly reduced.

SUMMARY OF THE INVENTION

The invention seeks in particular to solve this problem by providing a booster whose thickness and shape may be modified in order to obtain a minimum weight. The booster obtained is such that it has a great resistance to wrenching, including at the location of the join between the cover and the cylinder of the casing.

For this, the invention proposes a device for assembling a booster and more precisely a cover and a cylinder of a casing of the booster. The assembly device of the invention allows a continuous swaging, over the whole external periphery of the casing, of the cylinder and of the cover. Continuous swaging makes it possible to obtain a strong hold of the two parts, one on the other. The zone of contact offers a better resistance to the wrenching forces.

To achieve such a continuous swaging, the device of the invention is furnished with at least one set of rollers. The rollers are rotated about the booster. The rollers come into contact with the booster at the location of the join between the cover and the cylinder of the casing. The rollers, when they pass, fold one end of a metal sheet forming the wall of the cylinder around an end of a metal sheet forming the wall of the cover.

In a particular exemplary embodiment of the invention, the device is furnished with two different sets of rollers. The first set of rollers makes it possible to bend the end of the metal sheet forming the wall of the cylinder around the end of the metal sheet forming the wall of the cover, at a first angle. The second set of rollers, for its part, makes it possible to bend the metal sheet of the cylinder at a second, more acute angle than the first. A roller of the second set of rollers is not pressed against the external wall of the casing until a roller of the first set of rollers has first passed.

Thus, the rollers of the first set of rollers begin to bend the metal sheet of the cylinder. The first bending action makes it possible to bend, from an initial position parallel to an axis of rotation of the device, the metal sheet by thirty to sixty degrees. The metal sheet is thus partially pushed inward in the direction of the center of the booster. An initial position of the end of the wall of the cover is perpendicular to the end of the wall of the cylinder. "Initial position" means the position in which the cover and the cylinder are placed one on the other, but not attached to one another. After the pass of at least one roller of the first set of rollers, the metal sheet of the cylinder is folded back in the direction of the metal sheet of the cover, which it swages lightly. A roller of the second set of rollers is then pressed against the metal sheet of the casing, where the first roller passed, in order to further fold the metal sheet of the cylinder against the metal sheet of the cover. Ideally, the metal sheet of the cylinder is folded ninety degrees after the rollers of the second set of rollers have passed.

The sets of rollers of the device of the invention are, for example, furnished with three rollers each. The rollers of the first set are alternated with the rollers of the second set. For an assembly device of generally circular cylindrical shape, the rollers are distributed evenly over a complete perimeter of the device. Thus, for example, a roller of the first set is separated by 120° from another roller of the first set. A roller of the first set is separated by 60° from a roller of the second set.

So that the swaging is carried out in two successive steps, the rollers of the second set must be pressed against the wall of the casing only at the locations where the rollers of the first set have already passed. For this, in addition to a rotary movement of the rollers about the booster, each of the rollers is forced to make an alternating radial movement relative to the booster. Such an oscillating movement is made possible by an eccentric mechanism of the assembly device. The rollers of the two sets are angularly out of phase with one another. The rollers of one and the same set are however angularly in phase. Thus, the rollers of the first set and then the rollers of the second set are alternately brought toward the center of the booster. This is how to obtain a continuous swaging of the casing of the booster in one or more complete rotations of the rollers about the booster.

The invention also proposes a method of assembling the casing of the booster. The method of the invention makes it possible to swage the cover and the cylinder of the casing in a continuous manner over the whole external perimeter of the casing.

The subject of the invention is therefore a pneumatic booster for a motor vehicle braking device, characterized in that a cover and a cylinder of said booster are attached to one another over a complete external contour.

A further subject of the invention is a device for assembling a pneumatic booster, characterized in that it comprises
- a fixed cylindrical support whose internal volume is greater than the volume of a cover of the booster, the cover being housed in the support,
- a cylindrical cap whose internal volume is greater than the volume of a cylinder of the booster, said cap imposing an axial load on the cylinder,
- at least one set of rollers, rotated by a motor, the rollers rotating at least partially about the support.

An additional subject of the invention is a method of swaging a booster, characterized in that it comprises the steps
- a cover of a booster is inserted into a support of a swaging device, a top end of a wall of the cover resting on a top end of an internal wall of the support,
- a cylinder of the booster is placed on the cover, a bottom end of a wall of the cylinder resting on the top end of the wall of the cover,
- a cap of the swaging device is placed on the support, a bottom end of the cap compressing the bottom end of the wall of the cylinder onto the top end of the wall of the cover,
- a motor is actuated,
- the swaging rollers are made to rotate about the booster, by means of the motor,
- the bottom end of the wall of the cylinder is swaged continuously onto the top end of the wall of the cover.

The invention will be better understood on reading the following description and on examining the figures that accompany it. The latter are given as an indication and in no way limit the invention.

BRIEF DESCRIPTION OF THE DRAWINGS

FIG. 2a and FIG. 2b are enlarged views of FIG. 1 at the location of a connection between a cover and a cylinder of the booster, and of a roller of the invention; and FIG. 3 is a cross section of an assembly device of the invention.

DETAILED DESCRIPTION OF THE INVENTION

Figure 1:
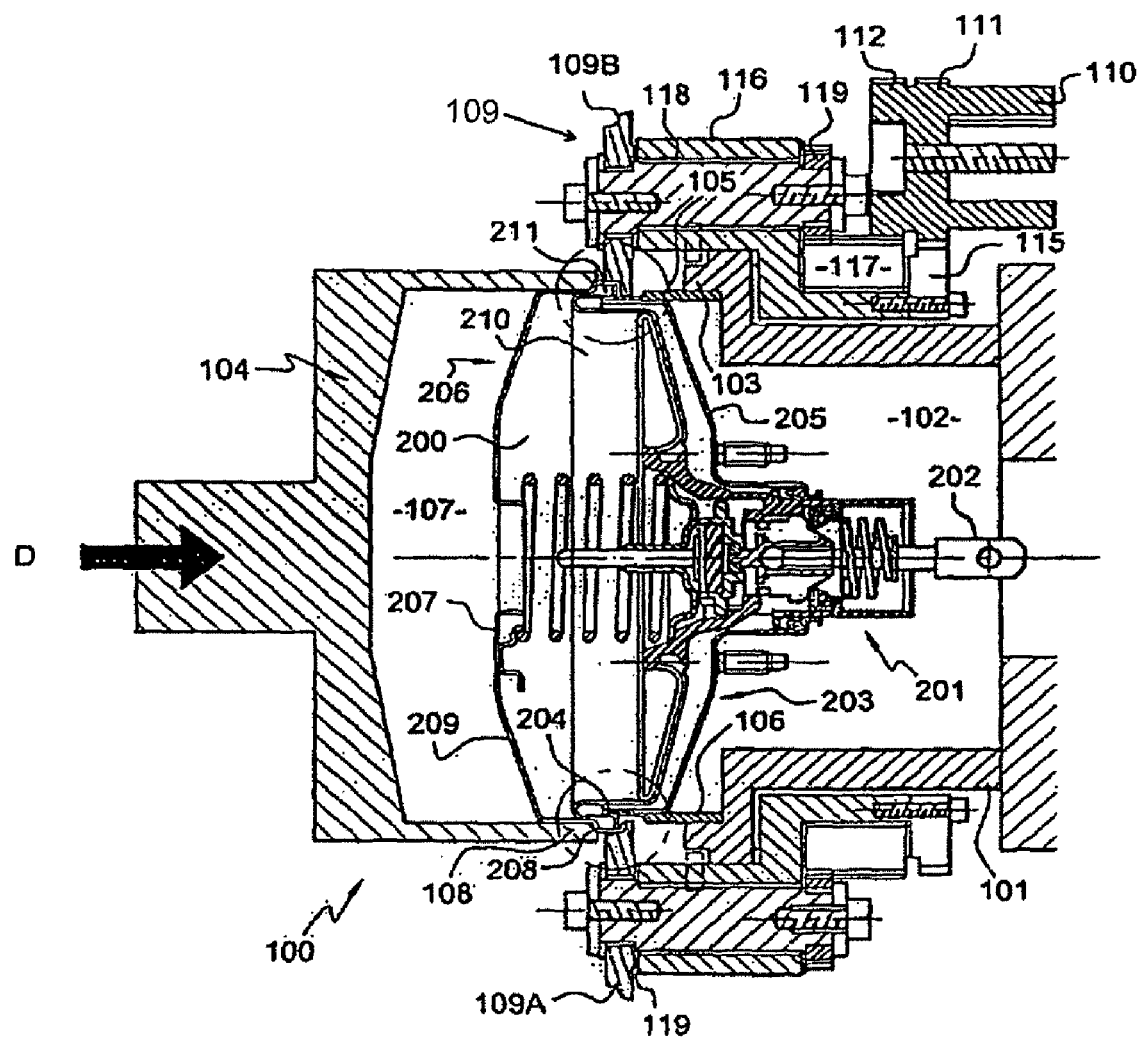
FIG. 1 is a longitudinal section of a booster housed in an assembly device of the invention.

FIG. 1 shows an exemplary embodiment of a device 100 for assembling a booster 200. The device 100 is furnished with a fixed support 101. In the example represented in FIG. 1, the support 101 has a generally cylindrical shape. An internal volume 102 of the support 101 is such that it is possible to insert therein a rear portion 201 of the booster 200. "Rear portion 201 of the booster 200" means a control rod 202 and cover 203 of the booster 200. The cover 203 also has a generally cylindrical shape.

One end 2004 of a wall 205 forming the cover 203 rests on a top end 105 of a center positioner 106. The center positioner 106 is, for example, generally ring-shaped. A diameter of the ring 106 is approximately equal to an internal diameter of the support 101 in the location of a top end 103 of the support 101. Thus, the center positioner 106 is placed in an internal perimeter of the support 101 in the location of a top end 103. The center positioner 106 makes it possible to ensure a good position for the cover 203. "Good position of the cover 203 in the support 101" means a position allowing the device 100 to successfully assemble the booster 200.

In another exemplary embodiment, the center positioner 106 consists of at least two distinct parts. Thus, the center positioner 106 does not fully follow the internal contour of the support 101. It may be placed evenly, at different points on the internal diameter of the support 101. The various elements forming the center positioner 106 thus make it possible to support the cover 203 at certain points and to center it. In another embodiment, it is also possible to use no center positioner 106. The cover 203 then rests directly on the support 101, at the location of the top end 103 of said support 101.

Once the cover 203 has been placed in the interior 102 of the support 101, a cylinder 206 of the booster 200 is positioned. The cylinder 206 forms a front portion of the booster 200. The cylinder 206 has a generally cylindrical shape. The cylinder 206 is placed on the cover 203 so that an end 208 of a wall 209 forming the cylinder 206 rests on the end 204 of the cover 203. In the example shown in FIG. 1, an end 211 of a sealing membrane 210 of the booster 200 forms a fold 211. The fold 211 is trapped between the ends 204 and 208 respectively of the cover 203 of the cylinder 206. The fold 211 particularly provides a seal at the location of contact between the cover 203 and the cylinder 206.

A cap 104 of the assembly device 100 is then placed on the support 101. The cap 104 is generally cylindrical in shape. An internal volume 107 of the cap 104 is such that the cylinder 206 can be housed therein. A first end 108 of the cap 104 rests against the end 208 of the wall 209 of the cylinder 206. "First end" means in the description the end directed toward the left in the figure. Conversely, "second end" means in the description the end directed toward the right in the figure. The end 108 of the cap 104 is then pressed in a direction D onto the end 208 of the cylinder 102. This imposes an axial load at the location of the connection between the cover 203 and the cylinder 206. The fold 211 is compressed between the two walls 205 and 209 at the location of their ends, respectively 204 and 208.

Rollers 109 (two rollers visible in FIG. 1) are placed on an outer periphery of the support 101. FIG. 3 shows more precisely the disposition of the rollers 109 of the device 100. The rollers 109 are six in number. Rollers 109A of a first set are interspaced with rollers 109B of a second set. The rollers 109 are placed evenly over the whole periphery of the support 101.

FIG. 1 shows that the rollers are in contact with the booster 200 at the location of the connection between the cover 203 and the cylinder 206.

FIGS. 2a and 2b show two enlargements, respectively an enlargement of FIG. 1 at the location of contact between a roller 109A and the booster 200, and at the location of contact between a roller 109B and the booster 200. In both cases, it can be seen that the end 204 of the cover 203 rests on the top end 105 of the center positioner 106. Similarly, the fold 211 of the sealing membrane 210, compressed between the end 204 of the cover 203 and the end 208 of the cylinder 206 can be seen. The end 208 of the cylinder 206 is compressed by the end 108 of the cap 104. The end 208 of the cylinder 206 is approximately parallel to an axis of rotation of the center positioner 106. The end 204 of the cover 203, for its part, is perpendicular to the end 208. The end 208 extends toward the right in FIG. 2a beyond a point of contact with the end 204.

In the invention, the end 208 can be bent around the end 204 and the fold 211 so that the end 208 is ideally perpendicular to the axis of the center positioner 106. The desire is to achieve such a bend on the whole periphery of the booster 200.

For this, as shown in FIG. 1, the assembly device 100 is furnished with a gearing element 110 rotating the rollers 109 all about the booster 200. The gearing element is itself rotated by a motor (not shown). The gearing element 110 is furnished with two gear wheels 111 and 112. The wheels 111 and 112 have a different number of teeth.

By means of the first wheel 111, the gearing element 110 rotates the whole set of rollers 109A and 109B about the booster 200. The second gear wheel 112 rotates an eccentric 118 imposing a periodic sinusoidal movement on the rollers 109. Thus, by means of this eccentric 118, the rollers 109 are not pressed continuously against the walls 205 and 209 of the booster 200.

When the assembly device 100 is placed in motion, the rollers 109 rotate continuously all about the booster 200 and are pressed radially against the walls 205 and 209 of the booster 200 in a periodic intermittent manner. The sets of rollers 109A and 109B are angularly out of phase. The angular-out-of-phase arrangement is such that it allows a pressure of the rollers 109A against the wall of the booster 200 to alternate with a pressure of the rollers 109B.

In order to achieve a good swage, the desire is to press the rollers 109A radially against the booster 200 before the rollers 109B. Specifically, the rollers 109A and 109B differ from one another in their angles of attack. FIGS. 2a and 2b show that the rollers 109A and 109B are all furnished respectively with a bevel 113A and 113B. A beveled cut forming the bevels 113A and 113B is made on a top face of the rollers 109A and 109B. The shape of the bevels 113A and 113B is different. Specifically, an angle of attack 114A of the bevel 113A is greater than the angle of attack 114B of the bevel 113B. "Angle of attack" means the angle formed by the beveled cut of the bevels 113.

A first contact between the roller 109A and the end 208 of the wall 209 of the cylinder 206 makes it possible to slightly bend the end 208 in the direction of an axis C of the support 101. The roller 109B is then pressed against the end 208 that is already partially bent. Since the angle of attack 114B is less than the angle of attack 114A, it is possible to bend the end 208 slightly more in the direction of the axis C.

For example, the angle of attack 114A lies between 115° and 135°. The angle of attack 114B, for its part, lies between 80° and 90°. In a preferred example, the angle of attack 114A is 120°. Thus, the end 208 is folded 60° during the pass of the roller 109A. Then, during the pass of the roller 109B, the end 208 is bent an additional 25°. Finally, the end 208 is virtually perpendicular to the axis of the center positioner 106. The end 208 swages the end 104 while trapping the fold 211.

In the invention, such a swaging operation is performed over the whole periphery of the booster 200. The device 100 makes as many rotations around the booster 200 as necessary for the cylinder 206 to be attached to the cover 203.

FIG. 1 shows a particular exemplary embodiment of the device making it possible to rotate the rollers 109 and impart thereto a radially oscillating movement relative to an axis C of the support 101.

The gear wheel 111 of the gearing element 110 rotates a pinion 115. A body 116 is attached to the pinion 115. The body 116 is therefore rotated by the rotation of the wheel 111. The body 116 is thus rotated all around the support 101. The wheel 112 of the gearing element 110 rotates a pinion 117. The pinion 117 is attached free in rotation to the body 116. Thus, the pinion 117 rotates independently of the body 116. The rotations of the body 116 and of the pinion 117 depend respectively on the rotation of the wheel 111 and the wheel 112 of the gearing element 110. The number of teeth of the wheel 111 is different from the number of teeth of the wheel 112. The body 116 and the pinion 117 therefore do not rotate at the same speed. The pinion 117 rotates the eccentric 118 by means of a pinion 119. The eccentric 118 follows at least partially an internal periphery of the body 116.

The rollers 109 are mounted on a top end of the eccentric 118. The eccentric 118 is attached to the body 116. The rollers 109 are therefore rotated all about the booster 200. But since the eccentric 118 is also in contact with the pinion 117, the pinion 117 imposes a radial oscillating movement relative to the axis C of the support 101 on the eccentric 118 and the rollers 109.

This gives, in addition to a rotary movement of all the rollers 109 about the booster 200, a radial oscillating movement of each of the rollers 109 relative to the axis C of the support 101. The rollers 109 are therefore periodically pressed against the wall of the booster 200 and then separated therefrom. The angular-out-of-phase arrangement between the rollers 109A and the rollers 109B makes it possible to press the rollers 109A first against the wall of the booster 200. The rollers 109B are pressed only after the rollers 109B have passed.

The invention claimed is:

1. A method of swaging a booster, the method comprising inserting a cover of the booster into a support of a swaging device so that a top end of a wall of the cover rests on a top end of an internal wall of the support,
placing a cylinder of the booster on the cover so that a bottom end of a wall of the cylinder rests on the top end of the wall of the cover,
placing a cap of the swaging device on the support so that a bottom end of the cap compresses the bottom end of the wall of the cylinder onto the top end of the wall of the cover,
using a motor to cause swaging rollers to rotate about the booster, and
continuously swaging the bottom end of the wall of the cylinder onto the top end of the wall of the cover.

2. The method according to claim 1, further comprising causing the rollers to move in a radially oscillating manner relative to an axis of the support.

3. The method according to claim 2, further comprising using an eccentric driven by a gearing element to cause the rollers to move in a radially oscillating manner relative to an axis of the support.

4. The method according to claim 3, further comprising swaging the bottom end of the wall of the cylinder onto the top end of the wall of the cover by successively applying rollers with a first angle of attack and rollers with a second angle of attack, the first angle of attack being greater than the second angle of attack.

5. The method according to claim 1, further comprising causing periodic sinusoidal movement of the rollers.

6. The method according to claim 5, further comprising pressing the rollers against the booster in a periodic intermittent manner.

7. The method according to claim 6, further comprising swaging the bottom end of the wall of the cylinder onto the top end of the wall of the cover by successively applying rollers with a first angle of attack and rollers with a second angle of attack, the first angle of attack being greater than the second angle of attack, wherein the rollers with a first angle of attack and the rollers with a second angle of attack are out of phase, such that the pressure of the rollers with a first angle of attack alternates with the pressure of the rollers with a second angle of attack.

8. The method according to claim 1, further comprising holding the booster fixed and causing the rollers to travel around the booster.

* * * * *